(12) United States Patent
Öhrle et al.

(10) Patent No.: US 7,905,172 B2
(45) Date of Patent: Mar. 15, 2011

(54) LAMINATE MEMBRANE

(75) Inventors: Joachim Öhrle, Herrenberg (DE); Leon Radom, Ellhofen (DE)

(73) Assignee: ULMAN Dichtungstechnik GmbH, Sindelfingen (DE)

( * ) Notice: Subject to any disclaimer, the term of this patent is extended or adjusted under 35 U.S.C. 154(b) by 559 days.

(21) Appl. No.: 11/580,098

(22) Filed: Oct. 12, 2006

(65) Prior Publication Data

US 2008/0020178 A1 Jan. 24, 2008

(30) Foreign Application Priority Data

Jul. 21, 2006 (EP) .................................. 06015242

(51) Int. Cl.
*F01B 19/00* (2006.01)
*F01B 19/02* (2006.01)
*F04B 45/00* (2006.01)
*F16J 3/00* (2006.01)
*F16J 3/02* (2006.01)

(52) U.S. Cl. ........... 92/103 R; 92/96; 92/98 R; 417/395; 417/474; 428/64.1; 428/66.6

(58) Field of Classification Search ................ 428/66.6, 428/64.1, 411.1, 473.5, 137; 92/5, 96, 98, 92/103; 417/53, 474, 395

See application file for complete search history.

(56) References Cited

U.S. PATENT DOCUMENTS

| 4,781,535 A * | 11/1988 | Frawley et al. ................ 417/53 |
| 2003/0230191 A1* | 12/2003 | Ohrle et al. .................... 92/98 R |
| 2004/0214028 A1* | 10/2004 | Kawamoto et al. ........ 428/473.5 |

FOREIGN PATENT DOCUMENTS

DE   102 27 192   1/2004

* cited by examiner

*Primary Examiner* — Brent T O'Hern
(74) *Attorney, Agent, or Firm* — Collard & Roe, P.C.

(57) ABSTRACT

A laminate membrane having an elastomer body and a contact layer applied to the elastomer body. The contact layer is made of polytetrafluoroethylene (PTFE). A barrier layer configured as a permeation barrier is additionally provided, which is disposed between the contact layer and the elastomer body, or applied to the side of the contact layer that faces away from the elastomer body.

4 Claims, 5 Drawing Sheets

LAMINATE MEMBRANE

BACKGROUND OF THE INVENTION

1. Field of the Invention

The invention relates to a laminate membrane having an elastomer body and a contact layer applied to the elastomer body, made of polytetrafluoroethylene (PTFE).

The laminate membrane can be installed into a membrane pump, for example. In this connection, the membrane is clamped in on the edges, while the inner region of the laminate membrane performs stroke movements. With each stroke movement, a flexible membrane segment is turned up, and rolling movements of the flexible material are observed in a radial cross-section. Alternatively, however, the membrane can also be used as a valve membrane. Fundamentally, however, the laminated membrane according to the invention, as described below, can be used for the most varied purposes.

2. The Prior Art

A laminate membrane having the characteristics described initially is described in German Patent No. DE 102 27 192 A1. Here, the elastomer body is chemically connected with the PTFE layer on the product side. In the case of special applications such as pumping of solvents, for example, loosening of the PTFE contact layer from the elastomer body can occur. Also, in these cases, the elastomer layer can be chemically attacked by the solvent, despite the PTFE contact layer.

SUMMARY OF THE INVENTION

It is therefore an object of the invention to increase the useful lifetime of a laminate membrane.

This task is accomplished, according to the invention, by an additional barrier layer configured as a permeation barrier, which is either disposed between the contact layer and the elastomer body, or applied to the side of the contact layer that faces away from the elastomer body. The barrier layer effectively prevents permeation of the medium that impacts the membrane all the way to the elastomer body. Furthermore, the contact surface between barrier layer or contact layer, respectively, and elastomer body is also not impacted with medium, because of the permeation barrier effect of the barrier layer, so that there is no risk of loosening of the barrier layer or the contact layer, respectively, from the elastomer body.

Preferably, at least one intermediate layer is disposed between the barrier layer and elastomer body. This intermediate layer in turn can contain PTFE, or, according to a particularly preferred embodiment of the invention, it consists of PTFE. The barrier layer can contain a perfluoroalkoxy copolymer (PFA), or preferably consists of PFA. Finished films having the structure PTFE-PFA-PTFE are commercially available, for example, and can be used cost-advantageously.

The elastomer body can be configured in plate shape, particularly as a circular plate, which has a plate wall with a clamping surface, a bottom, and a flexible membrane segment that connects the plate edge with the bottom. The bottom of the elastomer body can have a core that is vulcanized, having a connector device for a piston rod, or alternatively, the elastomer body can have a central opening for connection to a piston rod. The elastomer body preferably contains a textile reinforcement insert, but can also be configured without such a reinforcement. Furthermore, the elastomer body can contain a ring-shaped circumferential depression on its elastomer back side, in the transition region between the plate edge and the flexible membrane segment.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views:

FIG. 1A shows a detail of FIG. 1;

FIG. 4A shows an enlarged portion of FIG. 4; and

DETAILED DESCRIPTION OF THE PREFERRED EMBODIMENT

Figure 1:
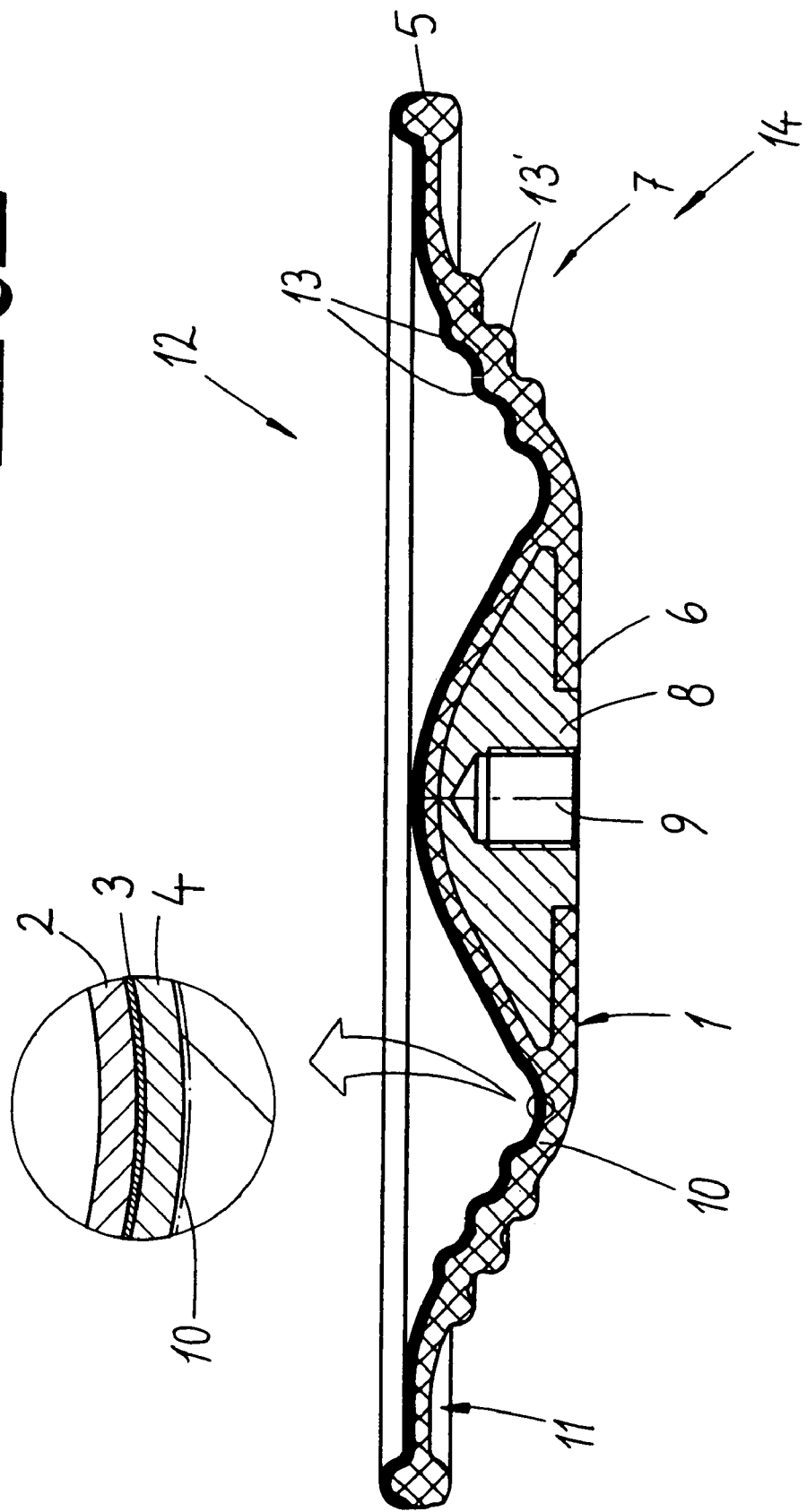
FIG. 1 shows a radial cross-section through a laminate membrane according to the invention.

FIG. 1 shows a laminate membrane for membrane pumps, having a plate-shaped elastomer body 1 and a product-side contact layer 2 made of PTFE. It is particularly evident from the detail magnification of FIG. 1A that a barrier layer 3 that serves as a permeation barrier is disposed between the contact layer 2 and the elastomer body 1. Furthermore, an intermediate layer 4 is provided between barrier layer 3 and elastomer body 1. Intermediate layer 4, just like the product-side contact layer 2, consists of PTFE, while barrier layer 3 consists of PFA.

Figure 2:
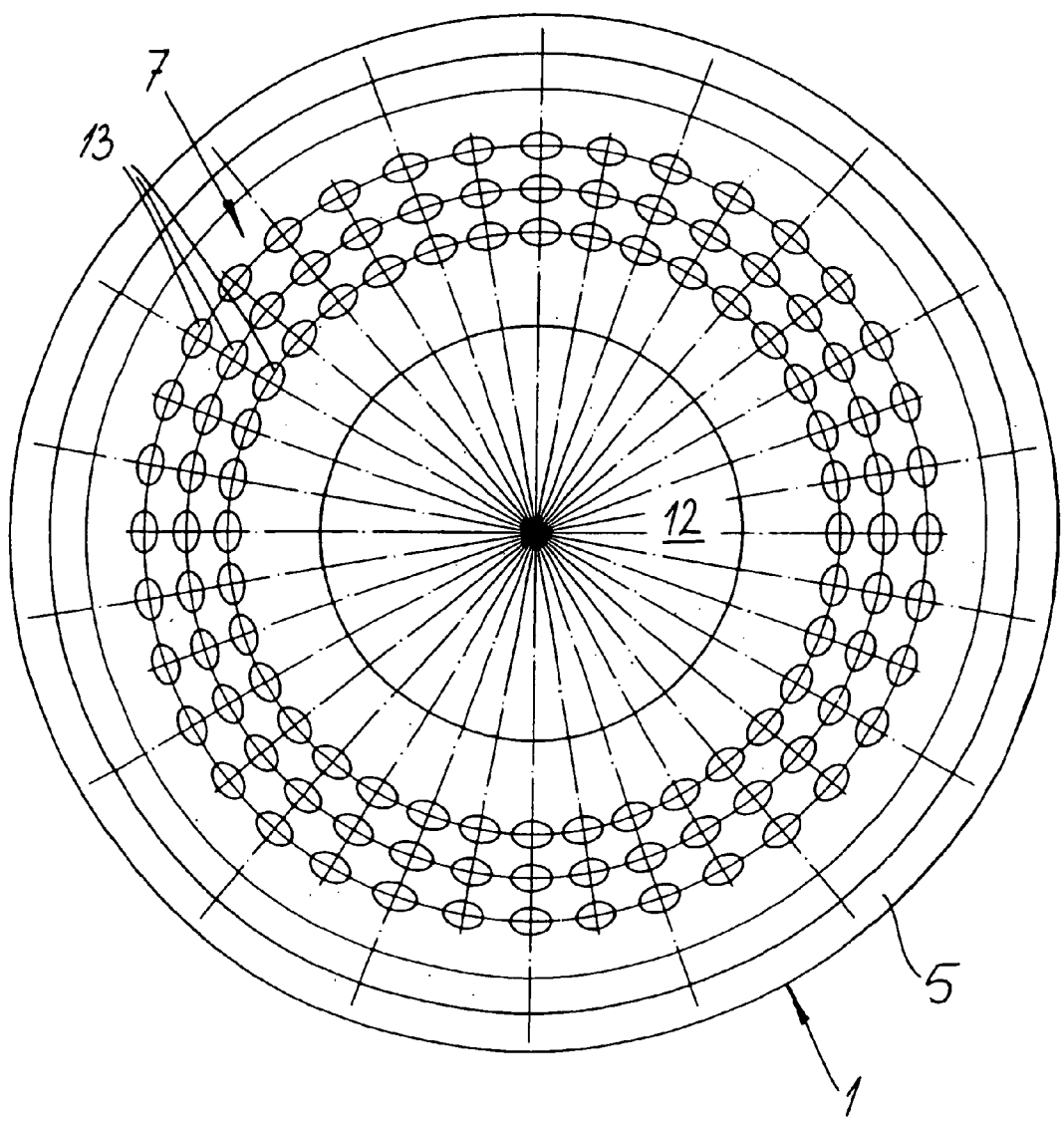
FIG. 2 shows a top view of the laminate membrane shown in FIG. 1.
Figure 3:
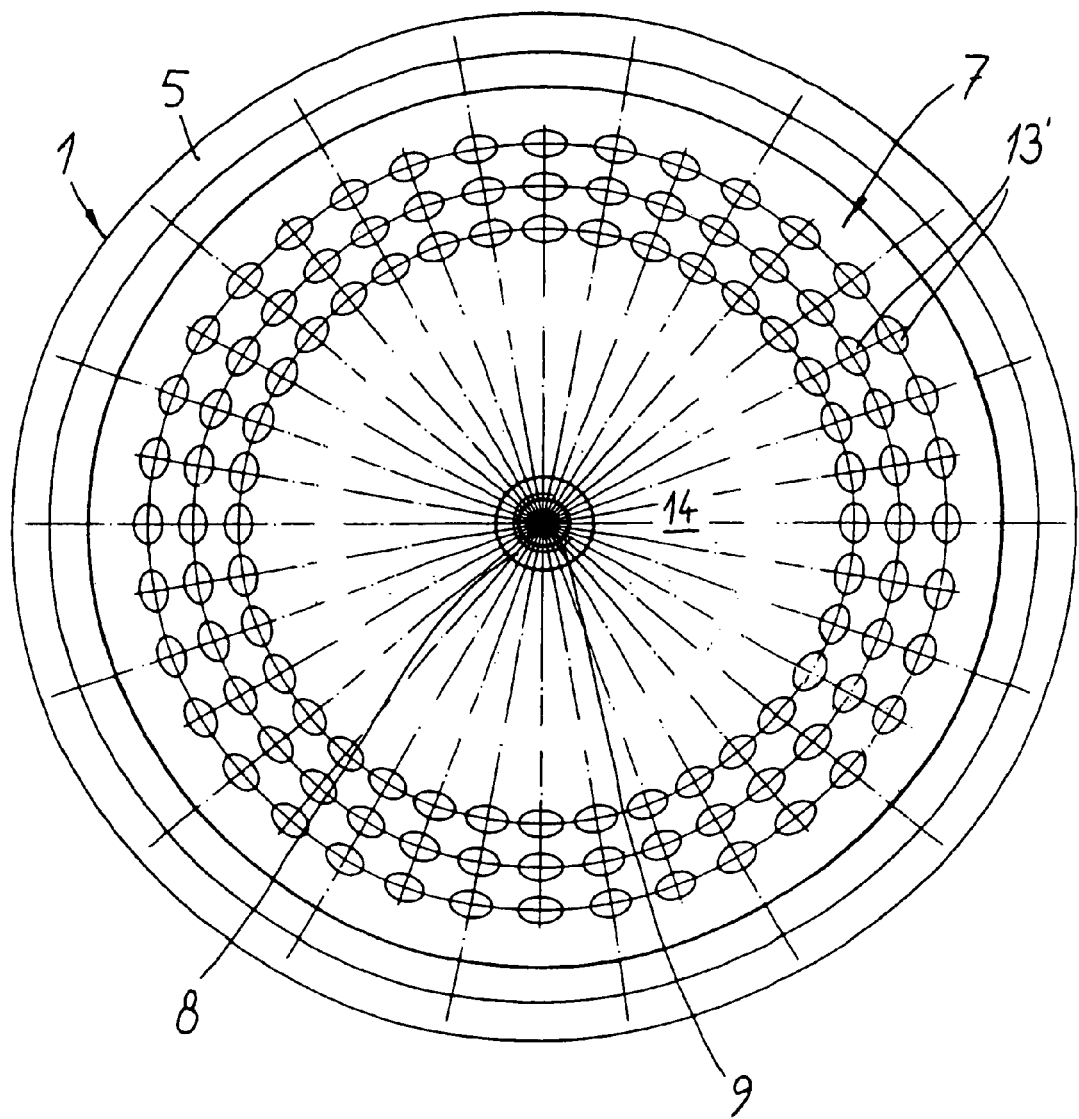
FIG. 3 shows a bottom view of the laminate membrane shown in FIG. 1.

As shown in FIG. 1, elastomer body 1 is configured as a circular plate that has a plate edge 5 with a clamping surface, a bottom 6, and a flexible membrane segment 7 that connects the plate edge 5 with bottom 6. In FIG. 1, bottom 6 of elastomer body 1 contains a core 8 that is vulcanized, with a connector device 9 for a piston rod. Elastomer body 1 itself contains a textile reinforcement layer 10 and has a ring-shaped circumferential depression 11 on its elastomer back side, in the transition region between plate edge 5 and flexible membrane segment 7. Looking at FIG. 1 to 3 together, it becomes evident that flexible membrane segment 7 has a plurality of nubs 13 on its top side 12, facing the product, which form elevations in PTFE contact layer 2. Nubs 13 are configured as calottes, i.e., cup-like elevations, having a base area that is preferably circular. Furthermore, flexible membrane segment 7 also has a plurality of nubs 13', which form elevations on the elastomer back side 14 of elastomer body 1. These nubs 13', as well, are configured as calottes having a preferably circular base area.

Figure 4:
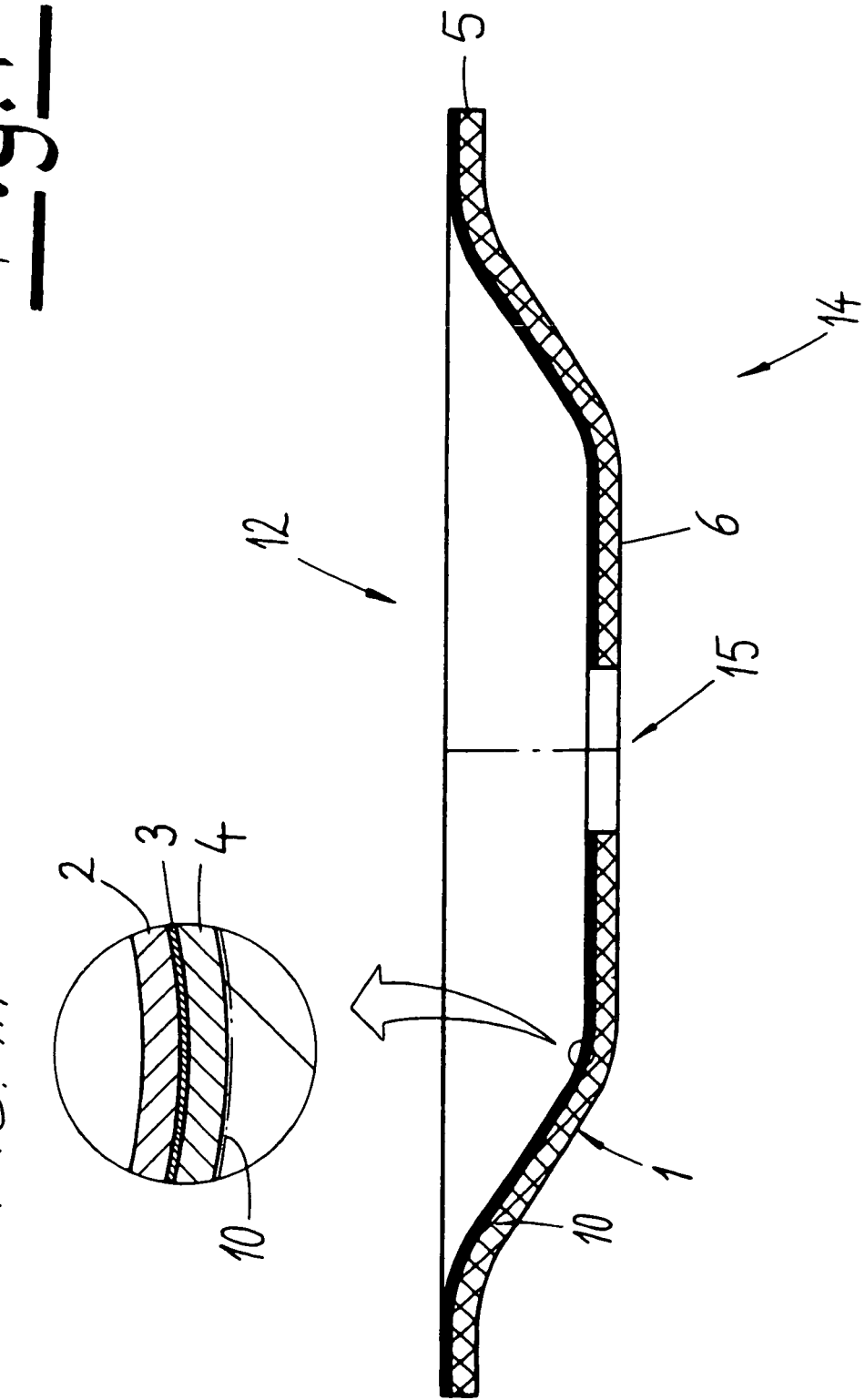
FIG. 4 shows an alternative embodiment of the invention, in a representation that corresponds to FIG. 1.

FIG. 4 shows an alternative embodiment of the invention, in which bottom 6 of elastomer body 1 has a central opening 15 for connecting to a piston rod.

Figure 5:
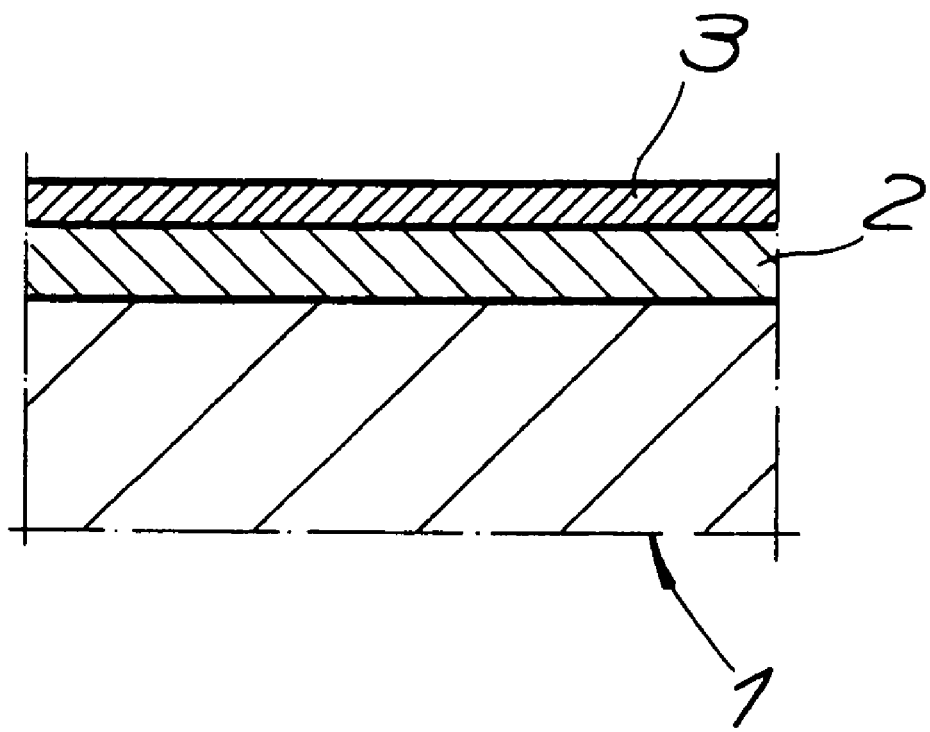
FIG. 5 shows a detail representation of a further embodiment of the invention.

According to another alternative embodiment of the invention, shown in FIG. 5, barrier layer 3 that consists of PFA is applied to the side of PTFE contact layer 2 that faces away from the elastomer body 1.

Accordingly, while only a few embodiments of the present invention have been shown and described, it is obvious that many changes and modifications may be made thereunto without departing from the spirit and scope of the invention.

What is claimed is:

1. A laminate membrane for membrane pumps, comprising:
   an elastomer body configured as a circular plate that has a plate edge with a clamping surface, a bottom and a flexible membrane segment that connects the plate with the bottom and is turned up with each stroke movement of the bottom;
   a contact layer applied to the elastomer body and made of polytetrafluoroethylene (PTFE); and
   a barrier layer configured as a permeation barrier,
   wherein the barrier layer is made of a perfluoroalkoxy copolymer (PFA) and is applied to a side of the contact layer that faces away from the elastomer body.

2. A laminate membrane according to claim 1, wherein the bottom of the elastomer body contains a vulcanized core having a connector device for a piston rod, or contains a central opening for connection to a piston rod.

3. A laminate membrane according to claim 1, wherein the elastomer body contains a textile reinforcement insert.

4. A laminate membrane for membrane pumps comprising:
   an elastomer body configured as a circular plate that has a plate edge with a clamping surface, a bottom and a flexible membrane segment that connects the plate with the bottom and is turned up with each stroke movement of the bottom;
   a product-side contact layer made of polytetrafluoroethylene (PTFE);
   an intermediate layer made of polytetrafluoroethylene (PTFE) and abutting the elastomer body; and
   a barrier layer configured as a permeation barrier disposed between the contact layer and the intermediate layer, wherein the barrier layer consists of a perfluoroalkoxy copolymer (PFA) and abuts against the product-side contact layer and the intermediate layer so that said product-side contact layer, said barrier layer and said intermediate layer form a three-layered structure of PTFE/PFA/PTFE on said elastomer body.

* * * * *